June 2, 1964  C. C. STONE  3,135,856
METHOD AND APPARATUS FOR SEALING TUBES
Filed June 27, 1962  3 Sheets-Sheet 1

INVENTOR.
Cecil C. Stone
BY
Roland A. Anderson
Attorney

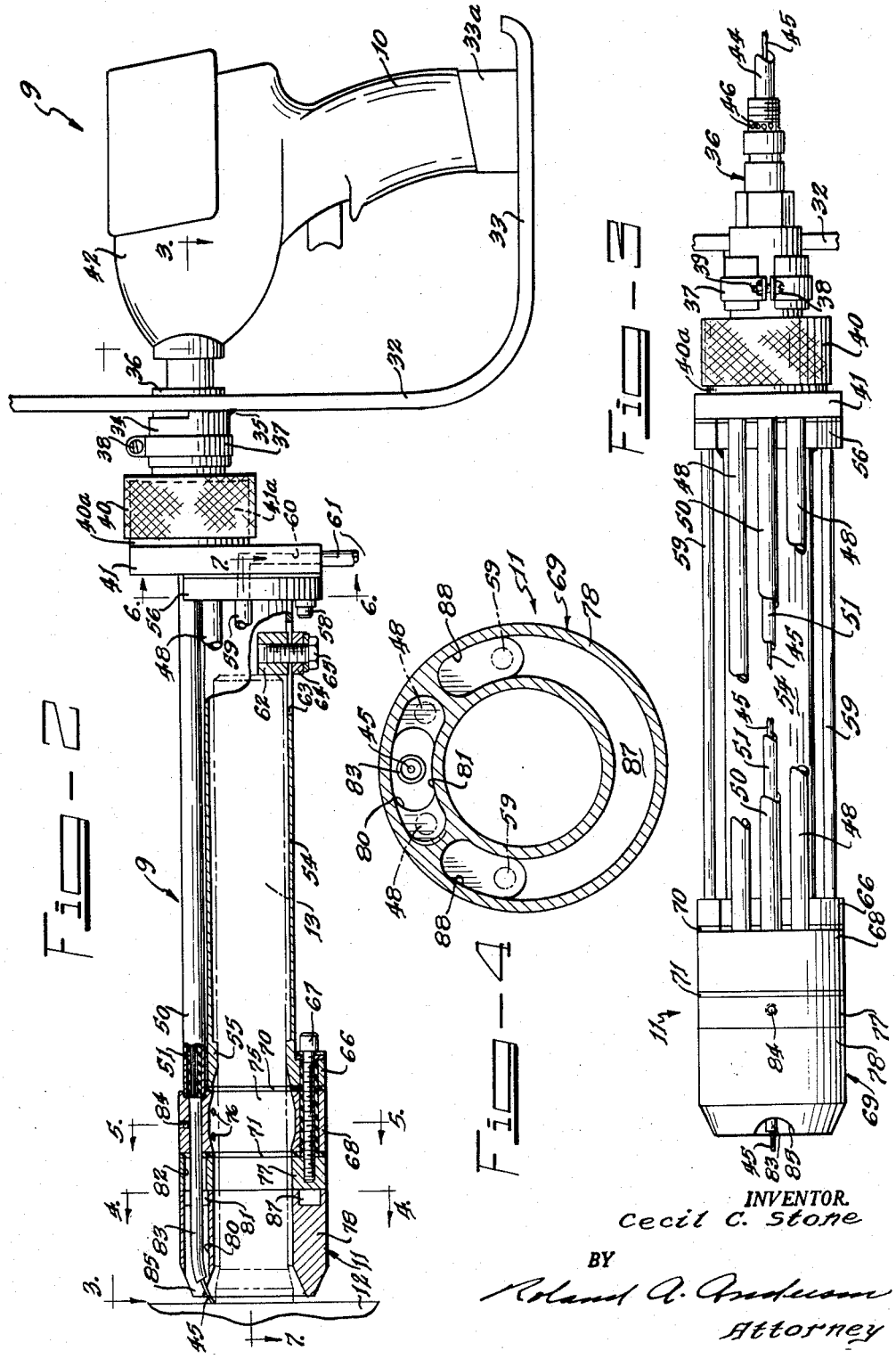

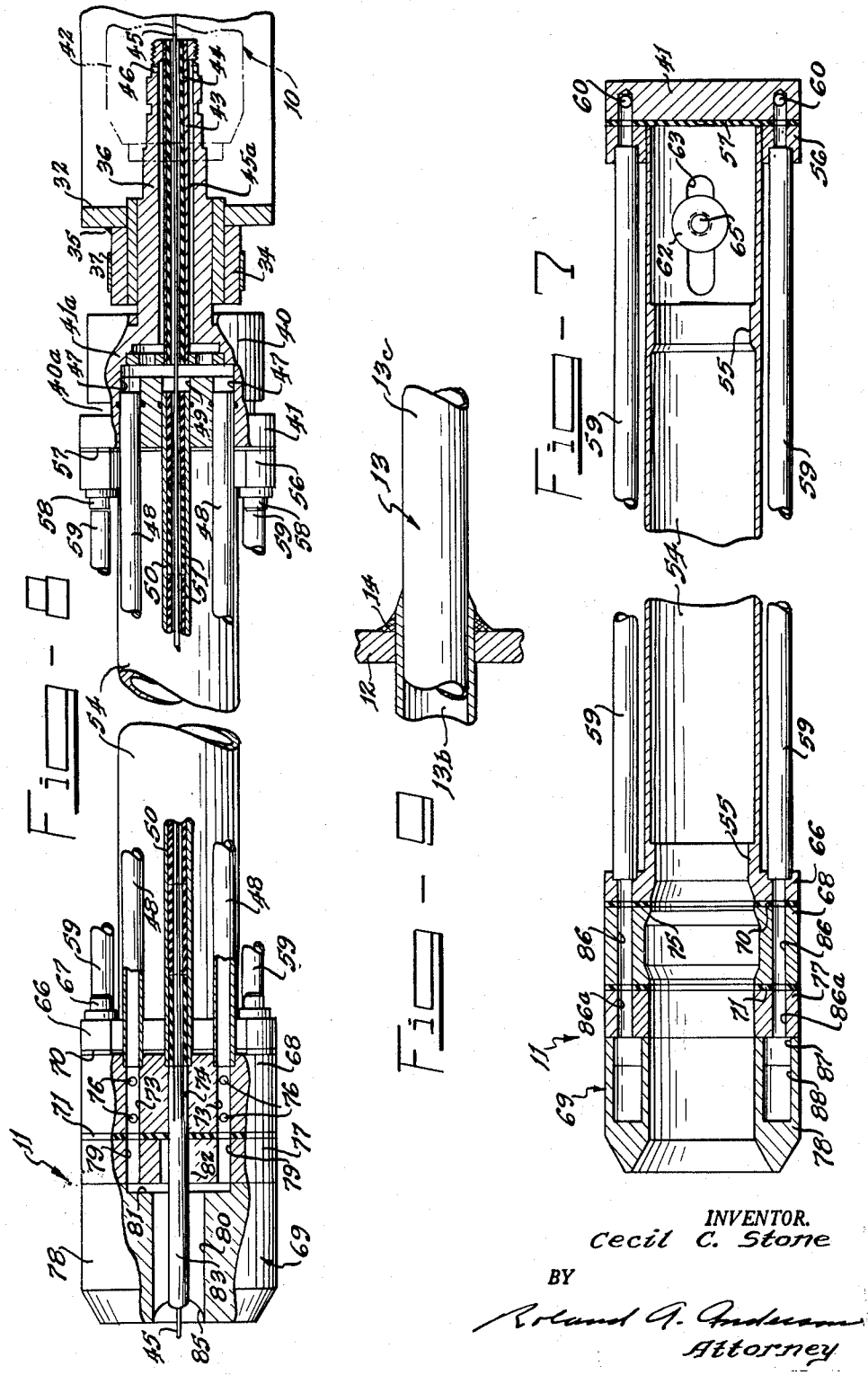

United States Patent Office 3,135,856
Patented June 2, 1964

3,135,856
METHOD AND APPARATUS FOR
SEALING TUBES
Cecil C. Stone, Downers Grove, Ill., assignor to the United States of America as represented by the United States Atomic Energy Commission
Filed June 27, 1962, Ser. No. 205,808
4 Claims. (Cl. 219—124)

The invention relates to a novel method and apparatus for sealing tubes in tube sheets and, more particularly, to the fabrication of heat exchangers where a high degree of freedom from leaks is required.

There is difficulty in making good sealing welds between tubes and a tube sheet. If the weld is sufficient for a good seal, the heat due to an arc weld may burn a tube and perforate it if it is thin-walled. This is particularly disadvantageous in a heat exchanger for a nuclear reactor operating with an aqueous solution and liquid alkali metal, for the reaction between these liquids is of dangerous violence in the event of a leak.

It is known to arc-weld tubes to a sheet, for example, when the tubes are vertical and a self-consuming electrode rotating about the tubes is used. There is great danger of burning the tube particularly if the electrode is self-consuming. In this case, the arc is frequently directed against the tube, rather than the weld metal, in such a way as to burn the tube. Even if the tube is not burned, such limited control of the weld metal may be exerted as to produce a weld of limited strength and sealing properties.

It is an object of the present invention to provide a method and apparatus for producing an improved weld between a tube and a tube sheet.

A further object is to provide a method and apparatus for producing an improved arc weld in which the burning of parts being welded is avoided and the weld metal is controlled so as to increase the strength and sealing properties of the metals.

Another object is to produce a weld of the above qualities between a tube and a tube sheet by a method and apparatus employing a consumable electrode.

Other objects will appear as the description proceeds.

All the foregoing objects are attained by my discovery that welds of an extremely high degree of reliability may be made between tubes and a tube sheet by rotating the tubes and sheet as a whole about a horizontal axis while maintaining the tubes horizontal and by welding at a region of the tube somewhat displaced from its top by a welding apparatus that is held against rotation while moving with the tube during its rotation. Thus, a consumable electrode, which is fed horizontally by the welding apparatus, is applied to successive regions of the tube displaced the same amount from the top of the tube regardless of which position of rotation the tube occupies or which tube is being welded. Moreover, my method and apparatus are simple and flexible, requiring only comparatively inexpensive modifications of commercially obtainable welding equipment, and permitting easy adjustments as the work proceeds.

Reference is now made to the drawings,

FIG. 1 of which is a front view of the apparatus for carrying out the method of the invention.

FIG. 2 is a sectional side view of a portion of the same apparatus.

FIG. 3 is a partly broken away top view of part of the same portion.

FIG. 4 is a sectional view of the same portion sectioned at right angles to the view of FIG. 2.

FIG. 7 is a broken-away, partly sectional view of the portion of FIG. 3.

FIG. 8 is another broken-away, partly sectional view of the same portion.

FIG. 9 is a broken away, partly sectional view of the tube, tube sheet and weld therebetween, produced by the method of the invention.

Figure 1:
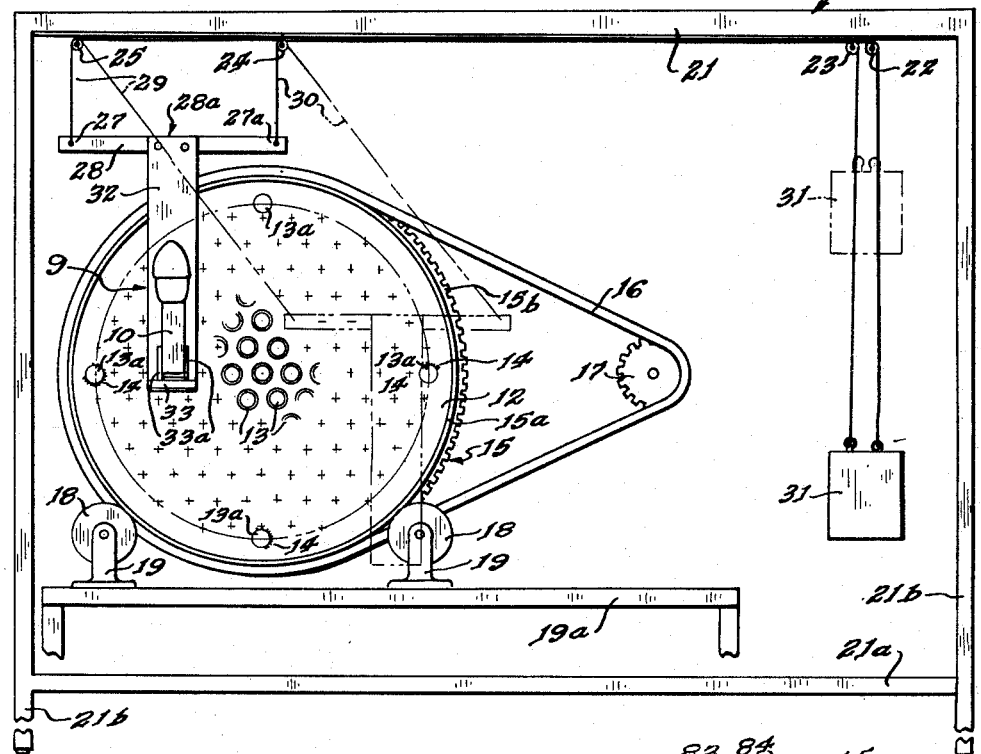

As shown in FIGS. 1 and 2, an arc-welding gun 9 has a pistol grip 10 and a nozzle 11, directed at a tube sheet 12. The tube sheet has openings receiving a plurality of tubes 13 arranged in a geometric pattern, some of which are shown in detail, and others indicated schematically by small crosses. One of the plurality, tube 13a near the periphery of tube sheet 12, is shown in four positions it occupies as the method of the invention is carried out. It will be noted that at the top position, or at 12 o'clock if tube sheet 12 is considered an imaginary clock dial, tube 13a has no weld around it. At the right, or at 3 o'clock on the same imaginary dial tube 13a is surrounded by a weld 14 beginning at about 11 o'clock if the boundary between the tube and the tube sheet is considered to be a smaller imaginary clock dial, and ending at about 2 o'clock on that dial. When tube 13a is at the bottom, or at 6 o'clock on the larger imaginary dial the weld fillet 14 extends on its small imaginary dial from 11 o'clock to 5 o'clock, and when the tube is at 9 o'clock on the larger dial the fillet extends from 11 to 8 o'clock. The reason for this lag of "one hour" by the weld 14 on the smaller imaginary clock dial with respect to the position of the tube 13a on the larger imaginary clock dial will become apparent as the description of the invention proceeds.

As shown in FIG. 1, the tube sheet 12 and tubes 13 form part of a heat exchanger 15, which also includes a circular cylindrical shell 15a joined to the edge of the tube sheet 12 and enclosing the tubes 13. The wall 15a extends perpendicular to the plane of the paper in FIG. 1. A sprocket 15b surrounds and is secured to the shell 15a at a region intermediate its ends and meshes with a sprocket chain 16, which is driven by a sprocket 17, driven by a source of power (not shown). The heat exchanger 15 rotatably rests on four idler wheels, the front two of which are shown at 18, and these are rotatably mounted on brackets 19 attached to a table 19a.

A mobile frame 20 is provided, which comprises upper and lower horizontal beams 21 and 21a and vertical beams 21b. Near one end of beam 21 a pair of closely spaced pulleys 22 and 23 is rotatably mounted. Near the other end of beam 21 a pair of widely spaced pulleys 24 and 25 is rotatably mounted. The spacing of pulleys 24 and 25 is equal to the distance between rope holes 27 and 27a in a horizontal cross member 28 of a harness 28a for the welding gun 10. Ropes 29 and 30 connect harness beam 28 to a counterweight 31, rope 29 being connected to the hole 27 near one end of beam 28 and passing over pulleys 25 and 23, and rope 30 being connected to the hole 27a near the other end of beam 28 and passing over pulleys 24 and 22. Since the pulleys 24 and 25 are on the same horizontal line and have the same spacing as the rope holes 27 and 27a in cross member 28, the ropes 29 and 30 and counterweight 31 keep the cross member 28 horizontal regardless of its position. Thus, the cross member 28 is horizontal, both in the full-line position and in the broken-line position of FIG. 1.

The harness 28a has a main vertical member 32, which as shown in FIG. 1 has its upper end secured to a mid region of the cross member 28, and, as shown on FIG. 2, has at its lower end a horizontal extension 33. The extension 33 is attached by brackets 33a to the grip 10 of the welding gun 9. A split collar 34, which is joined by a peripheral weld 35 to the vertical member 32, receives a tubular fitting 36 of the welding gun 9, the tubular member extending through the vertical member 32. A clamping band 37, regulated by a bolt 38 and nut 39, permits the collar 34 to be clamped against the tubular member 36.

A knurled cap 40, having an internal screw thread engaging an external screw thread on an extension 40a in a junction block 41, clamps a head 41a of tubular fitting 36 against extension 40a and thus secures the junction block to the tubular fitting. As shown in FIGS. 2 and 8, the tubular fitting 36, which is of brass, extends into a body 42 of the gun 9 and carries a brass tubular insert 43 soldered to the fitting. The insert 43 receives a nylon tube 44 through which a consumable wire electrode 45 moves. Shielding gas for the welding operation flows through the tube 44 as well as through an annular cylindrical space 45a between the insert 43 and the fitting 36. Shielding gas reaches the space 45a from the gun body 42 through openings 46 in the fitting 36.

The junction block 41, which is of brass, has two openings 47 which communicate with the space 45a between fitting 36 and insert 43 and carry the ends of two parallel spaced brass tubes 48 for shielding gas, which are secured to the block 41. The block 41 also has an opening 49 in which is secured a brass tube 50 which is aligned with the tubular insert 44 and has between the tubes 48 in parallel spaced relationship thereto. A series of nylon tubular sections 51 fit in the tube 50 in end-to-end abutting relation with one another and the nylon tube 44.

Figure 6:
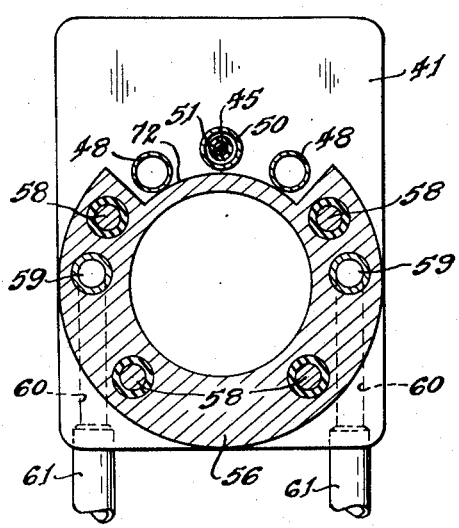
FIG. 6 is a third sectional view of the same portion sectioned still closer to the face than the view of FIG. 5.

As shown on FIGS. 2 and 6, a sleeve 54 receives any of the tubes 13 to be welded and has spaced constricted portions 55 fitting the tube for positioning the gun 9 for a welding operation. The sleeve 54 has at one end a collar 56, which is secured to the junction block 41 with an insulator 57 therebetween, by means of screws 58, which are insulated from the collar 56 and threaded into the block 41. As shown in FIGS. 2, 3 and 6, two coolant tubes 59 are secured at one end by brazing, in the collar 56 and communicate through L-shaped passages 60 in the block 41 with lines 61, which are connected with the bottom of the block. The coolant tubes 59 are outside the sleeve 54 and are parallel with, and spaced from tubes 48 and 50. The sleeve 54 is provided with an adjustable stop 62 which is engageable with the end of the tube 13 being welded. The stop 62, which lies within the sleeve 54, extends into a longitudinal stop 63 in the sleeve and is fixed thereto by a washer 64 engaging the outside of the sleeve and a screw 65 projecting through the washer and threaded into the stop 62.

The sleeve 54 has a collar 66, which is generally like the collar 56 but at the opposite end of the sleeve. The collar 66 has openings receiving the ends of coolant tubes 59, which are brazed to the collar. Screws 67, which extend insulated through collar 66 and a brass ring 68 and are threaded into nozzle 69, secure ring 68 to the collar 66 and the nozzle 11 to the ring. The ring is insulated from the collar 66 and the nozzle 11 by gaskets 70 and 71.

Figure 5:
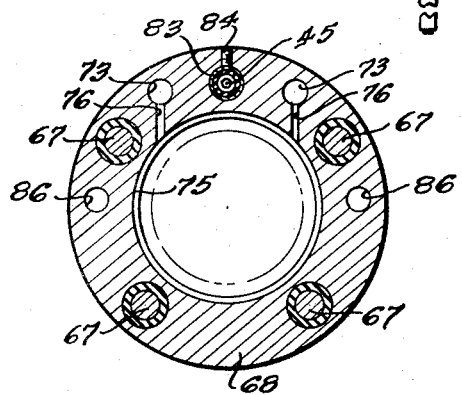
FIG. 5 is another sectional view of the same portion sectioned somewhat closer to the face of the apparatus than the view of FIG. 4.

The shielding gas tubes 48 and the electrode tube 50, which clear the collars 56 and 66 of sleeve 54 at large external recesses in the collars as indicated at 72 for the collar 56 in FIG. 6, have their ends brazed to the ring 68 at openings 73 and 74, respectively, as shown in FIG. 3. As shown in FIGS. 2 and 5, the ring 68, which is of brass, has a generally concave interior surface 75 into which four passages 76 extend from the openings 73 for the shielding gas tubes, two passages from each opening 73.

The nozzle 69 is formed of two brass parts 77 and 78 brazed together. As shown in FIGS. 2, 3, and 4, the nozzle part 77 has openings 79 which are aligned with opening 73 in the ring 68 and communicate with a wide arcuate opening 80 in the nozzle part 78 through a wider arcuate recess 81 in the end of nozzle part 78 facing part 77. The recess 81 communicates with an opening 82 in the nozzle part 78.

A copper contact tube 83 for the wire electrode 45 is secured to the ring 68 in electric contact therewith in the opening 74 by a set screw 84 and abuts the end tubular section 51 so as to prevent the series of sections 51 from being pulled or pushed out of the tube 50 by the wire electrode 45 as it moves toward the tube sheet 12. The contact tube 83 passes loosely through the openings 82 and 80 in the nozzle 11, without contact with the walls of the openings, so that there is no electrical contact between the contact tube and nozzle and there is space in these openings around the contact tube for shielding gas. As shown in FIG. 3, the ends of the electrode 45 and the contact tube 83 lie in a recess or pocket 85 formed in the end of the nozzle part 78.

The ring 68 has openings 86, shown in FIG. 5, and the nozzle part 77 has openings 86a aligned therewith. Through these sets of openings, the coolant tubes 59 communicate with an extensive arcuate coolant recess 87 formed in the nozzle part 78, as shown in FIGS. 2 and 4. The recess 87 is relatively shallow except at relatively deep end portions 88, which are adjacent the opening 80, contact tube 83, and wire electrode 45 for the sake of effective cooling of the welding region.

Conduit 83 protrudes into the space 85 almost to the tip of nozzle part 78, and electrode 45 extends slightly beyond that to a point where it can form a welding arc between itself and the workpiece, which is tube sheet 12 and tube 13 at their common boundary.

FIG. 9 shows the product in the invention in more detail. Up until now the tubes 13 being welded have been referred to as if they were a unit, since to do otherwise would be to go into confusing detail. In FIG. 9, the numeral 13 designates the tube generally as before, and the numerals 13b and 13c designate the inner and outer tubes which make up the "composite" type of tube that is customarily used in heat exchangers handling liquid metal for reasons of safety. However, for purposes of the present invention, the exact type of tube used is immaterial. What is important from the standpoint of the invention is the weld 14 which joins the tube sheet 12 to the tube 13, or more specifically, to its outer part 13b. It will be observed that a cross section of the weld resembles a right triangle with equal legs and a hypotenuse that is only slightly concave. This is the strongest possible configuration for a weld of this kind, and it is something that can be achieved only by the present invention with any degree of reproducibility.

To carry out the invention the welding gun 9 is placed over one of the tubes 13 in the manner shown in FIG. 2, and the stop 62 is adjusted so that the tip of the contact tube 83 comes to the proper distance from the boundary of the tube sheet 12 and the tube 13, or of the outer tube 13b if the tube is of the composite type. It will be noted that the tube 83 is bent downward slightly at its end; this causes the wire electrode 45 to bend downward also so as to confront the boundary exactly.

The shielding gas is then turned on for a time sufficient to purge the vicinity of the arc of air. Any shielding gas such as argon, helium and the like may be used, but I have found that a mixture of 5% by volume of oxygen and the balance argon gives unexpectedly good results. 60% of this mixture appears to be equivalent to 100% of pure argon in shielding power for some reason that is not apparent. However, any method of welding is operable even in the absence of shielding gas, although when this is the case the presence of either oxides, flux particles or both in the weld fillet necessarily weaken it to some extent.

If, as is preferable, a shielding gas is to be used, as soon as the air has been purged from the site of the arc the welding current is turned on and simultaneously the source of torque rotates the sprocket 17, and this, in turn, rotates the entire heat exchanger 15 on the idler wheels 18 by the action of drive chain 16 on the sprocket 17.

The rotation of the heat exchanger 15 is for one full turn. The rate of rotation necessarily depends on the materials being welded, the density of the welding current and the length of the boundary being welded. For stainless steel tubes of 1.438 inches outer diameter, or a boundary about 4.51 inches long, I have found that 15 seconds is to be preferred for making the turn of 360 degrees.

The gun 9 is then withdrawn and placed over another of the plurality to tubes 13 and the process repeated until all the tubes in the sheet have been sealed to it by welds. It should be noted that no matter how far off center a tube may be, such as the tube 13a, from the axis of the heat exchanger 15, the method will still work, since the main harness member 32 carrying the welding gun 9 is made to move horizontally and vertically while remaining parallel to itself in all, because the pulleys 24 and 25 are horizontally related to one another and are spaced the same amount as the rope holes 27 and 27a in the horizontal harness member 28, and the ropes 29 and 30 are kept tight by the counterweight 31.

Since the vertical orientation of the main harness member 32 is preserved even through the harness itself may be describing a circle of large radius, it is possible to orient the position of the electrode 45 with respect to the vector of gravity by means of the cap 40. I have found that the orientation of the electrode 45 has a marked effect on the quality of the weld fillet. For most cases the electrode 45 should be oriented from 30 to 60 degrees from the vertical in the direction contrary to the direction of the rotation of the tube 13. It is to be understood that the tubes 13 must fit the perforations in the tube sheet quite snugly so that when the heat exchanger 15 rotates as a whole there is no slippage, and the tubes accordingly rotate in the same direction as the heat exchanger and through the same number of degrees.

For example, when the tube 13 turns in the clockwise direction, the electrode 45 should be from 30° to 60° to the left, or at from about "10 to 11 o'clock," this less exact method of expressing degrees being sufficiently accurate for purposes of carrying out the invention. When the rotation is counter-clockwise the electrode 45 should be oriented to the right, or from about 1 to 2 o'clock.

The foregoing explains the lag of "one hour" between the weld, and heat exchanger's rotation above referred to in connection with FIG. 1. The tube may be in any position at the start, just so that the heat exchanger makes a full rotation during the welding. In FIG. 1 the place of starting is arbitrarily set at "12 o'clock," but it could bet set just as well at any other position without affecting the position of the electrode 45 on its smaller imaginary clock dial. However, for purposes of making the drawing some starting position had to be selected, and the 12 o'clock position was selected because it is the easiest to explain, and furthermore, it is preferable to choose this starting position in the practical operation of the invention. It is important that the welding be carried out for one turn, no more, no less, and it is easiest to see that this is done by starting and stopping at the top position. The drawing also selected the preferred 11 o'clock position as the starting welding position on the smaller imaginary clock dial, and this results in a one hour "lag," since when the tube 13 has advanced three hours to 3 o'clock, the weld fillet will only have advanced to 2 o'clock, it having started with a handicap of one hour. Again, if the electrode had originally been oriented at 10 o'clock on its dial, there would be a two-hour lag instead of a one-hour lag, the starting point for the tube, of course, being 12 o'clock. In the case of counterclockwise rotation, the electrode 45 would then start at from 1 to 2 o'clock and if the tube started at 12, the weld fillet would not show a lag but an advancement if the tube started at 12 o'clock.

The amount of orientation of the electrode 45 away from the vertical depends on a number of factors, such as the type of welding electrode used, its composition, whether consumable or nonconsumable, the composition and thickness of the tubes 13 and tube sheets 12, the speed of rotation of the tubes 1, the voltage, current density, and the like. In general, I prefer a consumable electrode having no flux component, a flux not being necessary when shielding gas is used.

I find that I can quickly gauge the soundness of the fillets produced by my invention by visual inspection. If the face of the fillet, or the hypotenuse of the triangle shown in FIG. 7, is more than slightly concave, it is an indication that the tube 13 is being rotated too fast. If the fillet is convex it indicates that it is being rotated too slowly. A lumpy, uneven fillet indicates that the electrode is oriented too close to the vertical, while a fillet showing unevenness due to hollowed-out places indicates that the orientation is too far from the vertical. The speed of rotation and the orientation should be adjusted to avoid those defects, and fortunately with my apparatus this is done without undue difficulty since my apparatus tends generally to make equilateral fillets even when not in perfect adjustment. This is in contrast to the previous methods where the tubes were held vertical during the welding; in these the tendency was for the fillets to be longer along the tube sheet than along the tube due to gravity, and it was difficult to equalize its dimensions. In my method where the tube sheet is vertical and the tubes horizontal, it might be expected that the vector of gravity would cause the fillets to have greater length along the horizontal tubes than along the tube sheets for the same reason. However, with my offset electrode apparatus, with its orientation of the electrode away from the vertical as the tube does the rotating, the tendency of gravity to produce unequal dimensions in the fillets is completely overcome.

The significant thing about the present welding arrangement is that the particular tube 13 being welded to the sheet 12 is rotated so as to move the region just welded upwardly at a slight vertical angle (clockwise from 10 or 11 o'clock) from the region about to be or now being welded. The result is that the weld metal just laid down tends to move whether from the consumable electrode 84 or other source of added material by gravity into the region now or about to be welded, so that there is always weld metal at the region where the electric arc is directed. Consequently, the tube 13 is protected from the direct action of the arc and is not so likely to be burned and perhaps perforated.

*Example I*

A heat exchanger for exchanging the heat from a Na-K alloy coolant from a nuclear reactor to water was fabricated according to the invention. The heat exchanger was of the composite-tube type having two tube sheets at each end, or a total of four tube sheets in each heat exchanger. Each heat exchanger had 73 tubes running through the four tube sheets. The tubes were of the composite type having an inner tube of 1.065" inner diameter and 1.250" outer diameter, and an outer tube of 1.250" inner diameter and 1.438" outer diameter. The outer tube was somewhat shorter than the inner tube, and extended through the two inner tube sheets but not through the outer ones. The material of the tubes and tube sheets was an alloy of 2¼% Cr, 1% Mo, both by weight, and the balance Fe.

In sealing the tubes to the tube sheets an apparatus similar to that of FIG. 2 was used. The electrode 27 was a consumable wire, 0.035" in diameter, of 1¼% Cr, ½% Mo, both by weight, and the balance Fe.

The method of the invention was carried out under the following conditions:

Voltage of welding arc — 28 volts.
Amperes of welding current — 250 amperes.
Cover gas — 25 cu. ft. Ar/hour.
Feed of electrode wire — 600 inches per minute.
Time of rotation of workpiece — 15 seconds.
Direction of rotation of workpiece — Clockwise.
Orientation of electrode — 11 o'clock.

*Example II*

An identical heat exchanger was fabricated under the same conditions except that the cover gas was a mixture of 5% oxygen and the balance argon which was fed at the rate of 15 cubic feet per hour. Results were equally good.

*Examples III–X*

Eight more, or a total of ten, heat exchangers were fabricated according to the methods of the preceding examples. Since each had 73 tubes and each tube passed through four sheets, 292 welds were required in each heat exchanger. For the ten heat exchangers 2920 welds were required. Of these 2920 welds only 4 showed signs of leakage, or 0.137%. This is a far lower percentage than has ever been achieved in any other method of tube sealing to tube sheets.

It will be understood that this invention is not to be limited to the details given herein, but that it may be modified within the scope of the appended claims.

What is claimed is:

1. An apparatus for welding a tube to a tube sheet of a heat exchanger, the tube being held by the tube sheet with sufficient snugness to prevent slippage, the apparatus comprising a sleeve exteriorly engageable with the tube, a nozzle attached to one end of the sleeve so as to be adjacent the tube sheet, means for feeding a consumable welding electrode along the sleeve and through the nozzle toward the boundary between the tube and the tube sheet, a harness attached to the end of the tube away from the nozzle, a pair of spaced pulleys located at the same level, a pair of ropes connected at one end to regions of the harness having the same spacing from one another as the pulleys, the ropes extending over the pulleys, a common counterweight attached to each of the ropes at the end remote from the harness, means for causing a welding current to flow from the electrode to the boundary between the tube and the tube sheet, and means for rotating the tube and tube sheet about an axis parallel with the tube.

2. An apparatus for welding a tube to a tube sheet of a heat exchanger having a cylindrical surface, the tube being held by the tube sheet with sufficient snugness to prevent slippage, the apparatus comprising a sleeve exteriorly engageable with the tube, a nozzle attached to one end of the sleeve so as to be adjacent the tube sheet, means for feeding a consumable welding electrode along the sleeve and through the nozzle toward the boundary between the tube and the tube sheet, a harness attached to the end of the tube away from the nozzle, a pair of spaced pulleys located at the same level, a pair of ropes connected at one end to regions of the harness having the same spacing from one another as the pulleys, the ropes extending over the pulleys, a common counterweight attached to each of the ropes at the end remote from the harness, means for causing a welding current to flow from the electrode to the boundary between the tube and the tube sheet, a plurality of wheels engageable with the cylindrical surface of the heat exchanger for rotatably supporting the same, and means adapted to be wrapped around said cylindrical surface for rotating the heat exchanger, and means for rotating the tube and tube sheet about an axis parallel with the tube.

3. A method of sealing the interface between a tube sheet in a vertical position and a horizontal tube fitting in an opening through the sheet, the said opening being located a distance from the center of said sheet, comprising rotating the sheet 360 degrees about its center while causing the tube horizontally to follow the said opening about the said center without exerting sufficient torsion on the tube to cause it to slip within the opening, simultaneously following the interface between the tube and the tube sheet with a movable consumable wire electrode while preventing rotation of the electrode and holding the electrode parallel to the tube and displaced from the top of the tube about 30° to 60° measured in a direction opposed to the rotation of the tube, and simultaneously maintaining a continuous welding arc between the electrode and the interface during the entire 360-degree rotation of the tube and the tube sheet.

4. An apparatus for welding the interface between an opening in a tube sheet and a tube fitting through the opening with sufficient snugness to prevent slippage, the said opening being located a distance from the center of the tube sheet, comprising means for causing rotation of the tube sheet 360 degrees about its center, means for causing the tube horizontally to follow the opening about the said center without exerting sufficient torsion on the tube to cause it to slip within the opening, a welding electrode, means for causing the electrode to follow the interface about the said center, means for maintaining constant the orientation of the electrode with respect to the vector of gravity, means for causing a welding current to flow between the electrode and the interface simultaneously with the rotation of the tube sheet.

References Cited in the file of this patent

UNITED STATES PATENTS

| | | |
|---|---|---|
| 1,738,573 | Goodspeed | Dec. 10, 1929 |
| 1,846,470 | Burnish | Feb. 23, 1932 |
| 3,104,313 | Rieppel et al. | Sept. 17, 1963 |